June 5, 1923.

D. F. COMSTOCK

CINEMATOGRAPHIC FILM

Original Filed Feb. 9, 1916

1,457,500

Inventor
Daniel F. Comstock
by Roberts, Roberts & Cushman
his Attorneys

Patented June 5, 1923.

1,457,500

UNITED STATES PATENT OFFICE.

DANIEL F. COMSTOCK, OF CAMBRIDGE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHIC FILM.

Original application filed February 9, 1916, Serial No. 77,237. Divided and this application filed October 6, 1920. Serial No. 415,074.

*To all whom it may concern:*

Be it known that I, DANIEL F. COMSTOCK, citizen of the United States of America, and resident of Cambridge, in the county of Middlesex and State of Massachusetts, have invented new and useful Improvements in Cinematographic Films, of which the following is a specification.

In the art of cinematography one of the factors which has to be contended with is the shrinkage and expansion of the celluloid base of the film. A very considerable shrinkage occurs when the film is carried through a wet process and dried, but there is also a considerable fluctuation corresponding to change in humidity. In ordinary black and white cinematography the shrinkage does not cause so much trouble as in other cases to be described later, because single pictures are exposed, printed, and projected separately in the camera, printer, and projector. Under such conditions the picture spaces are separately positioned by sprocket holes at the edge of the film, and since these sprocket holes are part of the film the shrinkage of the film is recorded in the sprocket holes and so is the same for each picture space. At no time in the black and white art is the distance from one picture to the next picture rigidly determined by the mechanism or by the optical system.

There have been proposed continuous motion projectors which eliminate flicker by exposing the following picture before the preceding one has been entirely cut off. In such a machine the optical or mechanical system rigidly implies a certain distance from one picture to the next, and if this condition is not met there is a lack of register; this difficulty is perhaps the principal one which prevents the continuous motion projector from being a practical machine.

Now, in color cinematography there are some systems which take the component pictures successively. In such systems the shrinkage causes no more trouble than it does in black and white; but other systems of color cinematography have an optical system for taking two or more pictures simultaneously; as for example by means of two lenses or a prism set incorporating a light-dividing means. In such systems, just as in the continuous motion projector, there is a distance between the two images which is determined by the optical system, and consequently in such systems variations in shrinkage of the film cause very serious trouble. It would not be so difficult if the distance between sprocket holes could be relied upon to remain constant between the time when they are perforated and when the film is exposed in the camera, because in such case the distance between the pictures as determined by the optical system could be made to correspond accurately with the pitch of the sprocket holes as determined by the perforating machine, so that in all subsequent manipulations the shrinkage of the film would be recorded in the sprocket holes. But even here changes in the humidity in the air cause the film to shrink or to expand, between the time of perforating and exposing, and these variations affect the pitch of the sprocket holes.

The principal objects of the present invention are to produce a film having complemental images which are geometrically identical so that they may be accurately registered or superposed according to either additive or subtractive methods; to produce a film in which the complemental images may be readily and accurately, and if desired, automatically registered either in projection according to an additive process or in reproduction for use in either an additive or subtractive process; to produce a film having complemental images which can be respectively transferred to a film coated on both sides with a contact printer; to produce a film having complemental images adapted to be simultaneously framed and registered by a single mechanism, particularly in projecting the images upon a screen according to an additive process, and to produce a film which is generally superior for color photography, particularly color cinematography.

Generally speaking, the invention consists in a film (i. e. an image bearing record) having a plurality of series of complemental images, the arrangement of the complemental images having the following unique characteristics. Certain images of each complemental set have corresponding sets of parallel elements directed similarly and other corresponding sets of parallel elements directed oppositely or otherwise differently; e. g. in a scene having a horizontal pointer mounted on a vertical post the pointer might be directed in the same direction in each image, say to the right, with the post directed downwardly in one series of images and upwardly in a complemental series. And the complemental images are not only thus arranged but they are preferably reversed with respect to each other so that if folded together about the axis of symmetry passing therebetween they register with each other. With the images thus arranged they can be more accurately and distinctly produced by various optical systems, the preferred forms of which are shown in my former application Ser. No. 77,237, filed February 9, 1916, of which this application is a division. Moreover they afford many other advantages which will be hereinafter referred to.

In order clearly to disclose the nature of the invention, I have shown, by way of illustration, certain preferred embodiments in the accompanying drawing, in which—

Figure 1:
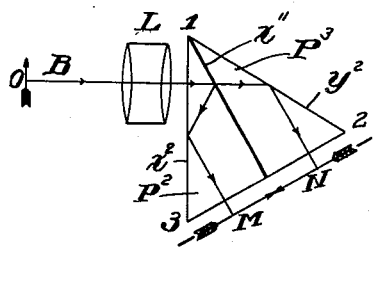
Figs. 1 and 2 show alternative optical systems and Fig. 3 illustrates the film produced thereby.

Referring now to Fig. 1, O represents the object, L the lens, and $P^2$ and $P^3$ prisms. The light beam B passes through the lens and the glass prism $P^2$ to the semitransparent reflecting surface $x''$, whence one-half the light is reflected to the totally reflecting surface $x^2$, and thence out of the prism to the film, forming the image at M. The remainder of the light passes on through the surface $x''$ and the prism $P^3$ to the totally reflecting surface $y^2$, and thence out of the prism to the film, forming a second image at N, inverted with relation to the image M (one beam having been reflected twice and the other once), so that the pictures on the film appear head to head or foot to foot.

It is desirable that prisms $P^2$ and $P^3$ be right-angled and identical, in order that the optical paths to the two images may be equal. It is also desirable, though not essential, that they form in section an equilateral triangle—in other words, that the angles 1, 2, and 3 be each 60°, so that the beam enters normally to the surface. If for any reason it is desired to use other angles a thin auxiliary prism may be interposed, presenting one face normally to the incident light, and having the other separated by an air-film from surface $x^2$ of prism $P^2$. This avoids the dispersion due to obliquity; but no advantages are obtained by departing from the 60° form.

It is evident that much space is saved by using the surface $x^2$ of the prism $P^2$ both as a transmitting surface, when the light first enters the prism, and also as a totally reflecting surface for that part of the light reflected back by surface $x''$.

Figure 2:
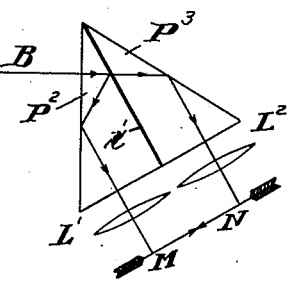

Instead of placing the symmetrical plane behind the lens, that is, between the lens and film, in which case the beam first passes through the lens and is then split to form two images, it may be placed before two or more lenses, that is, between the object and the lenses, as shown in Fig. 2, in which case the beam B is first split at the semitransparent surface $x'$ and then the two parts pass through two lenses $L'$ and $L^2$ to the two images M and N on the film. This arrangement makes the point of view of the two lenses the same, and avoids the stereoscopic effect which would result if the light passed directly from the object to the two lenses in two distinct beams. Since one beam has undergone one more reflection than the other, the images will be relatively inverted.

Thus, in order to obtain two pictures from accurately the same point of view at the same time, a plane of symmetry may be used, consisting of a semitransparent surface placed in a position either behind the lens and essentially symmetrical with respect to the two images, or in a position in front of two lenses and essentially symmetrical with respect to them. The arrangement may be varied in several ways, but the essential condition in obtaining relatively inverted images is the presence of such plane of symmetry.

With the use of the plane of symmetry it is possible to get, in the case of one lens, two paths between the lens and the film, of essentially the same lengths; and in the case of two lenses in the two paths from the plane of symmetry to the film, the virtual images of the two lenses coincide, hence the two lenses have precisely the same viewpoint regarding the scene to be photographed. In either case the two paths of the split light beyond the plane of symmetry where the light is split, are completely symmetrical to each other and to the plane of symmetry.

With the use of the plane of symmetry systems above described, two identical, or inverted and symmetrical images may be obtained on the film at the same time from precisely the same viewpoint. Such a film with relatively inverted or foot-to-foot pictures is illustrated in Fig. 3, wherein F represents a film of usual form, and $F'$ and $F'$ a pair of foot-to-foot, simultaneously made pictures of the same scene.

Figure 6:
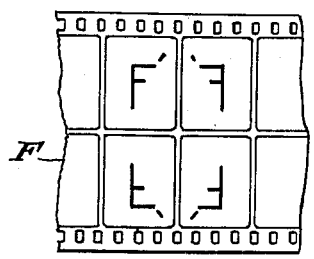
Figs. 6 and 7 illustrate films either of which may be produced thereby.

Should it be desired to obtain more than two such pictures, say three or four, this can be accomplished by adding a second plane of symmetry system to the system illustrated in Fig. 1, in the manner presently to be described. This will produce a film with four pictures of the same scene (or three by merely dropping out one picture) taken at the same time, from accurately the same point of view, and arranged symmetrically with relation to two axes, one transverse and one longitudial of the film, as illustrated in Fig. 6. In this form each picture F' on the film F is symmetrically arranged and inverted with relation to the adjoining picture of the pair, whether considered lengthwise or crosswise of the film; and the four pictures are symmetrical and relatively inverted with relation to two axes.

Figure 4:
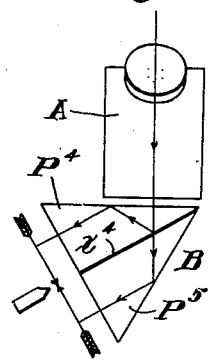
Figs. 4 and 5 are views at right angles of another optical system.
Figure 5:
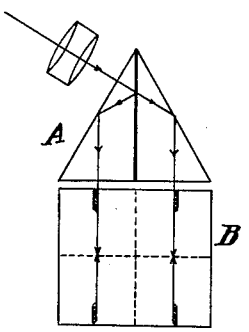

To produce such a film as that shown in Fig. 6, having four pictures of the same scene from the same point of view taken at the same time, the system illustrated in Figs. 4 and 5 may be used, Fig. 5 being an elevation viewed from the right of Fig. 4. The upper part A represents the same system as Fig. 1, and will produce two images as already explained. In order to get four pictures in symmetrical positions another similar set of prisms, twice as wide, is placed at B in such position that each ray is split again in a direction at right-angles to the former split produced by A. Each of the two split beams from A is again split by the semitransparent reflecting surface $x^4$, between prisms $P^4$ and $P^5$ (Fig. 4) in the same manner as already described with reference to Fig. 1, resulting in four symmetrical, relatively inverted images as shown in Fig. 6.

Figure 3:
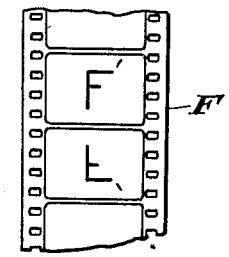
Figure 7:
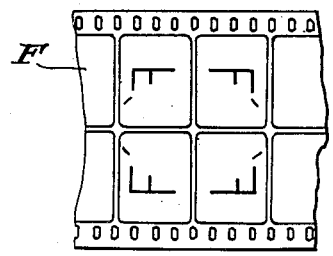

Fig. 7 is the same as Fig. 6 except in that the heads of the images are directed longitudinally of the film as in Fig. 3 instead of transversely of the film as in Fig. 6.

Figure 8:
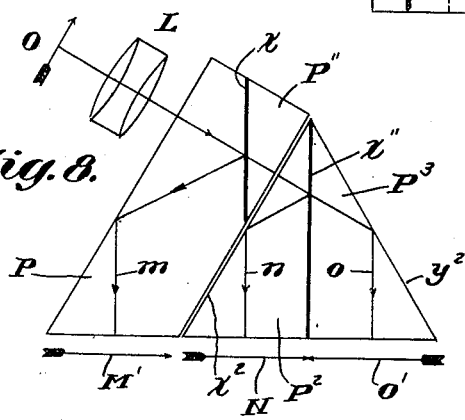
Fig. 8 shows still another form of optical system.
Figure 9:
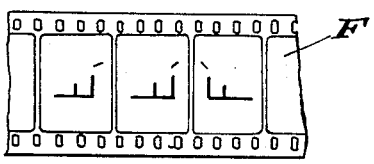
Fig. 9 illustrates a film produced by the latter system.

Fig. 8 illustrates an optical system adapted to produce a film having one image reversed relatively to two other images of the complemental set as illustrated in Fig. 9. This system comprises a lens L and a pair of prisms $P^2$ and $P^3$ corresponding to the similarly designated parts of Fig. 1, and in addition two prisms P and P'' interposed between the lens L and the prisms $P^2$ and $P^3$, the prisms P and P'' corresponding to the similarly designated parts of Fig. 1 in my former application Ser. No. 77,237, filed February 9, 1916. A light dividing semitransparent reflector $x$ is placed between prisms P and P'', and a similar reflector $x''$ is placed between prisms $P^2$ and $P^3$. Reflector $x$ may transmit substantially two-thirds of the light, half of which is reflected and half transmitted at $x''$, or the light may be otherwise proportioned between the component beams $m$, $n$ and $o$ if desired.

A feature in all of the above arrangements is exact equality between the two or more optical paths from lens to images. This is attained either by complete geometrical symmetry with respect to the surface which splits the beam, or (as in form shown in Fig. 8) by the exact optical equivalent of such symmetry, in that the lengths of the paths of the split beams in glass and in air are the same. This is highly advantageous as only in this way can the optical corrections for the glass be performed all at once by a single correcting device for the entire beam before the beam is split.

An important problem solved in each of the above devices is to obtain the desired arrangement of images and the necessary equality of paths, without excessive length of path from lens to images. This restriction results from the rigid limitation imposed by practical considerations on the focal length of the lens used,—a limitation which excludes many possible arrangements because of the too great length of path they require.

It follows that, unless metallic mirrors are used (which in general is not feasible), in systems involving a single lens, a large part of the path from lens to images must lie within the glass prisms used to divide and manipulate the light. This mass of glass acts as a lens and unless the prisms are coordinated with the objective so that the optical system as a whole is optically correct, aberrations (curvature of field, chromatic aberration, and spherical aberration) will result. Such a coordinated system is claimed in my patent Reissue No. 14,983, dated November 16, 1920. In order to coordinate the elements of the optical systems, especially where the objective lens is in the path of the main beam in contradistinction to a separate objective in the path of each divided beam, it is highly desirable that the part of every path from the lens to image which lies in glass be made equal; that is, that each part of the beam, after division, traverse the same distance in glass. This is an important feature of all the above arrangements.

It is of great importance that the geometrically identical images before referred to should be taken on the same film and not very distant from each other; and in practice the images of each complemental set should be adjacent, the practical limit of separation being of the order of magnitude of the width of the film. There are several reasons for this. In the first place, any film, during the mechanical and chemical processes of developing and fixing, undergoes a certain amount of change in form, principally shrinkage, and in general it cannot be assumed that two separate films will shrink to the same degree. Therefore, if the images were taken on two or more different films, they could not be relied upon to remain accurately the same in size through the process of development, printing and projecting upon the screen.

In the second place, the accurate superposition of two or more pictures on the projecting screen depends on the two or more images on the film used in projection, being either positioned to extreme accuracy or out of position by the same small amount. Actual practice proves that lack of register on the screen is more annoying than an irregular displacement of the picture as a whole, that is, of all of the two or more superposed images to the same degree. It is therefore important that the relative position on the screen of the two or more geometrically identical images should be more accurately constant than the mere positioning of non-attached films by the mechanism of the projector can accomplish. When the two or more images are on the same film and the film is treated uniformly throughout its length, pictures on the projecting screen once in register will remain accurately in register, since the slight irregularities of the mechanism when the pictures are similarly oriented involves similar displacements for all of the superimposed screen images.

From the foregoing, it will be evident that the complemental images of films as herein disclosed are geometrically identical owing to the identity between the light paths; they are superior with respect to definition owing to the relatively short glass paths; and by virtue of their reverse arrangement they afford many unique advantages among which may be mentioned the following.

With the ordinary multiplex film on which the images are all directed in the same direction, it is impossible to automatically register, with a single set of registering holes for each set of images, the respective images of each complemental set of images, for projection, for printing or for any other purpose, owing to the fact that when the film shrinks or expands (as it inevitably does) the distances between the registering holes and the respective images of the set change different amounts. However, with a film as herein disclosed, the registering holes may be positioned in the lines of symmetry between the images (or bearing a uniform relation to these lines), whereby shrinkage or expansion of the film is rendered harmless inasmuch as the positions of the complemental images relative to the corresponding registering holes change uniformly during shrinkage or expansion owing to the symmetrical arrangement of the images of each complemental set. This unique combination between the arrangement of images herein claimed and the arrangement of registering holes here alluded to is claimed in a separate application, Ser. No. 415,018, filed on even date herewith.

My improved film is also peculiarly adapted for use in the so-called " double coated " process in which complemental positives are formed in registry on opposite sides of a film coated on both sides. In producing such films, it is customary to print one series of images on one side of the double-coated film and subsequently to print the complemental series on the opposite side. With negatives of the type heretofore used, having all the images headed in the same direction, it is necessary either to print one series through the celluloid or to print one series by projection. However, with the complemental images reversed with respect to each other as herein disclosed, both series may be reproduced by contact printing and without printing either series through the celluloid, it being necessary merely to reverse the films endwise between the two printing operations.

Another advantage of my improved film is afforded in additive projection of the images. With the ordinary multiplex film where the images are directed in the same direction, the images can be framed and registered only by separate sets of mechanism, a set of mechanism for registering being required in addition to the framing mechanism owing to variations in the film due to shrinkage or expansion. With the present film on the other hand, wherein the reversed images are symmetrical with respect to a transverse line therebetween, only a single set of mechanism is required, the images being automatically registered when properly framed. However, inasmuch as the combination of symmetrical images with registering means bearing a uniform relation to the lines of symmetry is claimed in the aforesaid copending application, it is here only briefly mentioned to indicate another of the many unique capabilities of my improved film.

I claim:

1. A cinematographic film having a plurality of series of images, the images of the respective series being complemental to each other, the images of certain series having certain corresponding sides directed in the same direction and other corresponding sides directed in different directions.

2. A cinematographic film having a plurality of series of images, the images of the respective series being complemental to each other, the images of certain series being interposed between images of other series longitudinally of the film, and the images of one of the series being reversed with respect to the images of another of the series.

3. A cinematographic film having a plurality of series of images, the images of the respective series being complemental to each other, the images of different series alternating longitudinally of the film, and the images of one of the series being reversed with respect to the images of another of the series transversely of the film.

4. A cinematographic film having a plurality of series of images, the images of the respective series being complemental to each other, and the images of one of the series being reversed with respect to the images of another of the series longitudinally of the film.

5. A cinematographic film having on one side thereof a plurality of series of complemental images, images of the respective series alternating and images of each complemental set being reversed with respect to each other.

6. A cinematographic film having on one side thereof a plurality of series of complemental images disposed in a single row longitudinally of the film, the images of each complemental set being grouped together in juxtaposition and the images of one series being reversed with respect to the images of another series.

7. A cinematographic film having a plurality of series of complemental images taken from the same point of view at the same time, the images of certain series having corresponding sides directed in the same direction and other corresponding sides directed in opposite directions.

8. A cinematographic film having on one side thereof a plurality of series of complemental images taken from the same point of view at the same time, the images of each complemental set being grouped together in sets disposed longitudinally of the film and the images of one series being symmetrically reversed with respect to the images of another series so as to register with each other if folded together 9. A cinematographic film having a plurality of series of images, the images of the respective series being complemental to each other, the images of one series having their heads directed in one direction and the images of two other series having their heads directed differently.

10. A cinematographic film having a plurality of series of images, the images of the respective series being complemental to each other, and the images of two of the series being reversed with respect to the images of other of the series longitudinally of the film.

11. A cinematographic film having on one side thereof a plurality of series of complemental images taken from the same point of view at the same time, the images of each complemental set being grouped together in sets disposed longitudinally of the film and the images of two of the series being reversed with respect to the images of another series.

12. A cinematographic film having a plurality of series of images, the images of the respective series being complemental to each other, the images of three of the series being disposed in alinement longitudinally of the film, and the images of one of said three series being reversed with respect to the images of the other two series.

13. A cinematographic film having a plurality of series of images, the images of the respective series being complemental to each other, and the corresponding images of two series being disposed in non-superposed reversed relationship with respect to each other so as to register with each other if folded together.

14. A cinematographic film having a plurality of series of complemental images taken from the same point of view at the same time, the corresponding images of the series being disposed in non-superposed reversed relationship with respect to each other so as to register with each other if folded together.

15. A cinematographic film having thereon two complemental series of images, the complemental images having corresponding sets of parallel elements directed similarly and other corresponding sets of parallel elements directed differently.

16. A cinematographic film having thereon two complemental series of images, the complemental images having corresponding sets of parallel elements directed similarly and other corresponding sets of parallel elements directed oppositely.

17. A cinematographic film having a plurality of series of complemental images, the images of each complemental set being taken from the same point of view at the same time, the images of certain series being interposed between images of other series longitudinally of the film, and the images of one of the series being reversed with respect to the images of another of the series.

18. A cinematographic film having a plurality of series of complemental images, the images of each complemental set being taken from the same point of view at the same time, the images of one of the series being reversed with respect to the images of another of the series longitudinally of the film.

19. A cinematographic film having on one side thereof a plurality of series of complemental images, the images of each complemental set being taken from the same point of view at the same time, images of the respective series alternating and images of each complemental set being reversed with respect to each other.

20. A cinematographic film having a plurality of series of complemental images, the images of each complemental set being taken from the same point of view at the same time, the images of two of the series being reversed with respect to the images of other of the series longitudinally of the film.

21. A cinematographic film having a plurality of series of complemental images, the images of each complemental set being taken from the same point of view at the same time, the images of three of the series being disposed in alinement longitudinally of the film, and the images of one of said three series being reversed with respect to the images of the other two series.

22. A cinematographic film having thereon two series of complemental images, each pair of complemental images being taken from the same point of view at the same time, the complemental images having corresponding sets of parallel elements directed similarly and other corresponding sets of parallel elements directed differently.

23. A cinematographic film having thereon two series of complemental images, each pair of complemental images being taken from the same point of view at the same time, the complemental images having corresponding sets of parallel elements directed similarly and other corresponding sets of parallel elements directed oppositely.

24. A cinematographic film having a plurality of series of complemental images, the images of each complemental set being taken from the same point of view at the same time, the images of different series alternating longitudinally of the film, and the images of one of the series being reversed with respect to the images of another of the series transversely of the film.

25. A cinematographic film having a plurality of series of complemental images, the images of each complemental set being adjacent, the images of certain series having their corresponding sides directed in the same direction and other corresponding sides directed in different directions.

26. A cinematographic film having a plurality of series of complemental images, the images of each complemental set being adjacent, the images of certain series being interposed between images of other series longitudinally of the film, and the images of one of the series being reversed with respect to the images of another of the series.

27. A cinematographic film having a plurality of series of complemental images, the images of each complemental set being adjacent, and the images of one of the series being reversed with respect to the images of another of the series longitudinally of the film.

28. A cinematographic film having on one side thereof a plurality of series of complemental images, the images of each complemental set being adjacent, images of the respective series alternating and images of each complemental set being reversed with respect to each other.

29. A cinematographic film having a plurality of series of images, the images of the respective series being complemental to each other and the images of each complemental set being adjacent, the images of one series having their heads directed in one direction and the images of two other series having their heads directed differently.

30. A cinematographic film having a plurality of series of complemental images, the images of each complemental set being adjacent, the images of two of the series being reversed with respect to the images of other of the series longitudinally of the film.

31. A cinematographic film having a plurality of series of complemental images, the images of each complemental set being adjacent, the images of three of the series being disposed in alinement longitudinally of the film, and the images of one of said three series being reversed with respect to the images of the other two series.

32. A cinematographic film having a plurality of series of complemental images, the images of each complemental set being adjacent, and the corresponding images of two series being disposed in non-superposed reversed relationship with respect to each other so as to register with each other if folded together.

33. A cinematographic film having thereon two series of complemental images, the images of each complemental set being adjacent, the complemental images having corresponding sets of parallel elements directed similarly and other corresponding sets of parallel elements directed differently.

34. A cinematographic film having thereon two series of complemental images, the images of each complemental set being adjacent, the complemental images having corresponding sets of parallel elements directed similarly and other corresponding sets of parallel elements directed oppositely.

35. A cinematographic film having a plurality of series of complemental images, the images of each complemental set being adjacent and being taken at the same time, and the images of certain series having their corresponding sides directed in the same direction and other corresponding sides directed in opposite directions.

36. A cinematographic film having a plurality of series of complemental images, the images of each complemental set being adjacent and being taken at the same time, the images of certain series being interposed between images of other series longitudinally of the film, and the images of one of the series being reversed with respect to the images of another of the series.

37. A cinematographic film having a plurality of series of complemental images, the images of each complemental set being adjacent and being taken at the same time, the images of one of the series being reversed with respect to the images of another of the series longitudinally of the film.

38. A cinematographic film having on one side thereof a plurality of series of complemental images, the images of each complemental set being adjacent and being taken at the same time, images of the respective series alternating and images of each complemental set being reversed with respect to each other.

39. A cinematographic film having a plurality of series of images, the images of the respective series being complemental to each other, the images of each complemental set being adjacent and being taken at the same time, the images of one series having their heads directed in one direction and the images of two other series having their heads directed differently.

40. A cinematographic film having a plurality of series of complemental images, the images of each complemental set being adjacent and being taken at the same time, the images of two of the series being reversed with respect to the images of other of the series longitudinally of the film.

41. A cinematographic film having a plurality of series of complemental images, the images of each complemental set being adjacent and being taken at the same time, the images of three of the series being disposed in alinement longitudinally of the film, and the images of one of said three series being reversed with respect to the images of the other two series.

42. A cinematographic film having a plurality of series of complemental images, the images of each complemental set being adjacent and being taken at the same time, and the corresponding images of two series being disposed in non-superposed reversed relationship with respect to each other so as to register with each other if folded together.

43. A cinematographic film having thereon two series of complemental images, the images of each complemental set being adjacent and being taken at the same time, the complemental images having corresponding sets of parallel elements directed similarly and other corresponding sets of parallel elements directed differently.

44. A cinematographic film having thereon two series of complemental images, the images of each complemental set being adjacent and being taken at the same time, the complemental images having corresponding sets of parallel elements directed similarly and other corresponding sets of parallel elements directed oppositely.

Signed by me at Boston, Massachusetts, this fourth day of October, 1920.

DANIEL F. COMSTOCK.